(12) United States Patent
Sakata (10) Patent No.: US 9,451,559 B2
(45) Date of Patent: Sep. 20, 2016

(54) VEHICLE-MOUNTED DEVICE AND CONGESTION CONTROL METHOD

(71) Applicant: Masayuki Sakata, Tokyo (JP)

(72) Inventor: Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/800,902

(22) Filed: Jul. 16, 2015

(65) Prior Publication Data

US 2015/0319713 A1    Nov. 5, 2015

Related U.S. Application Data

(62) Division of application No. 13/825,933, filed as application No. PCT/JP2011/068111 on Aug. 9, 2011.

(30) Foreign Application Priority Data

Sep. 27, 2010   (JP) ................. 2010-215333

(51) Int. Cl.
| | |
|---|---|
| *H04B 15/00* | (2006.01) |
| *H04W 52/24* | (2009.01) |
| *H04W 24/08* | (2009.01) |
| *H04W 52/34* | (2009.01) |
| *H04W 4/04* | (2009.01) |

(52) U.S. Cl.
CPC .......... *H04W 52/243* (2013.01); *H04W 4/046* (2013.01); *H04W 24/08* (2013.01); *H04W 52/343* (2013.01)

(58) Field of Classification Search
CPC . H04L 47/30; H04L 12/5695; H04L 1/0002; H04L 1/0006; H04L 1/0019; H04L 47/10; H04L 47/11; H04L 47/12; H04L 47/14; H04L 47/24; H04L 47/745; H04L 47/762; H04L 47/788; H04L 47/824; H04W 28/14; H04W 52/282; H04W 84/12; H04W 24/00; H04W 28/06; H04W 28/08; H04W 28/10; H04W 28/18; H04W 48/08; H04W 4/046; H04W 52/04; H04W 52/146; H04W 52/225; H04W 52/26; H04W 52/265; H04W 52/267; H04W 52/287
See application file for complete search history.

(56) References Cited

U.S. PATENT DOCUMENTS

| | | | |
|---|---|---|---|
| 6,757,532 B1 * | 6/2004 | Haartsen | H04L 1/0002 |
| | | | 455/414.1 |
| 7,263,067 B2 | 8/2007 | Sreemanthula et al. | |

(Continued)

FOREIGN PATENT DOCUMENTS

| | | |
|---|---|---|
| JP | 2007-503144 A | 2/2007 |
| JP | 2008507883 A | 3/2008 |

(Continued)

OTHER PUBLICATIONS

International Search Report of PCT Application No. PCT/JP2011/068111 mailed Sep. 6, 2011.

(Continued)

*Primary Examiner* — Golam Sorowar (57) ABSTRACT

The invention has the object of avoiding congestion while reducing differences between parameters for communication among vehicles. The vehicle-mounted device performing communication by radio signals with predetermined vehicle-mounted devices respectively equipped in a plurality of vehicles includes: a radio unit detecting radio signals to measure congestion level; a processor receiving, from each of the predetermined vehicle-mounted devices, a value of, among parameters relating to communication of the predetermined vehicle-mounted devices, a predetermined parameter for which the degree of contribution to congestion increases with increase in the value of the predetermined parameter; and a controller decreasing, when the congestion level measured by the radio unit exceeds a predetermined threshold value, the value of the predetermined parameter of its own device if the value of the predetermined parameter of its own device is greater than the average of the values of the predetermined parameter received at the processor.

4 Claims, 4 Drawing Sheets

(56) References Cited

U.S. PATENT DOCUMENTS

| | | | |
|---|---|---|---|
| 2005/0107107 A1* | 5/2005 | Shahidi | H04W 28/08 455/522 |
| 2007/0223434 A1* | 9/2007 | Bennett | H04W 52/04 370/338 |
| 2009/0052371 A1 | 2/2009 | Ariyur | |
| 2011/0009151 A1* | 1/2011 | Miucic | H04L 1/0006 455/522 |
| 2011/0130099 A1 | 6/2011 | Madan et al. | |
| 2015/0319714 A1 | 11/2015 | Sakata | |

FOREIGN PATENT DOCUMENTS

| | | |
|---|---|---|
| JP | 2008205889 A | 9/2008 |
| JP | 2008236237 A | 10/2008 |
| JP | 2010-118907 A | 5/2010 |
| JP | 2010187120 A | 8/2010 |
| WO | 2008035600 A1 | 3/2008 |
| WO | 2008099716 A1 | 8/2008 |
| WO | 2009107297 A1 | 9/2009 |
| WO | 2009133740 A1 | 11/2009 |

OTHER PUBLICATIONS

Japanese Office Action for JP Application No. 2014-23791 mailed on May 12, 2015 with English Translation.

US Notice of Allowance for U.S. Appl. No. 13/825,933 mailed on Dec. 2, 2015.

US Office Rejfection for U.S. Appl. No. 14/800,914 mailed on Dec. 9, 2015.

Japanese Office Action for JP Application No. 2015-229398 mailed on Jul. 26, 2016 with English Translation.

* cited by examiner

FIG. 1

AT THE START OF CONGESTION CONTROL

| PARAMETERS | ITS OWN VEHICLE | AVERAGE (OTHER VE-HICLES 1-4) | OTHER VEHICLE 1 | OTHER VEHICLE 2 | OTHER VEHICLE 3 | OTHER VEHICLE 4 |
|---|---|---|---|---|---|---|
| CHANNEL LOAD FACTOR (%) | 10 | 40 | 80 | 20 | 40 | 20 |
| TRANSMISSION POWER (dBm) | 20 | 14 | 11 | 14 | 14 | 17 |
| RECEPTION SENSITIVITY (dBm) | -90 | -78.75 | -75 | -75 | -80 | -85 |
| TRANSMISSION COMMUNICATION RATE (Mbps) | 18 | 12 | 12 | 18 | 9 | 9 |
| TRANSMISSION SPACING (ms) | 600 | 400 | 800 | 400 | 200 | 200 |

AT THE TIME OF CANCELLATION OF CONGESTION CONTROL

| PARAMETERS | ITS OWN VEHICLE | AVERAGE (OTHER VE-HICLES 1-4) | OTHER VEHICLE 1 | OTHER VEHICLE 2 | OTHER VEHICLE 3 | OTHER VEHICLE 4 |
|---|---|---|---|---|---|---|
| CHANNEL LOAD FACTOR (%) | 15 | 17.5 | 15 | 25 | 20 | 10 |
| TRANSMISSION POWER (dBm) | 13 | 17 | 20 | 17 | 14 | 17 |
| RECEPTION SENSITIVITY (dBm) | -78 | -86.25 | -90 | -90 | -80 | -85 |
| TRANSMISSION COMMUNICATION RATE (Mbps) | 18 | 8.25 | 12 | 6 | 6 | 9 |
| TRANSMISSION SPACING (ms) | 600 | 200 | 100 | 400 | 100 | 200 |

VEHICLE-MOUNTED DEVICE AND CONGESTION CONTROL METHOD

CROSS-REFERENCE TO RELATED APPLICATIONS

The present application is a divisional application of U.S. patent application Ser. No. 13/825,933 filed on Mar. 25, 2013, which is a National Stage Entry of International Application PCT/JP2011/068111, filed on Aug. 9, 2011, which claims the benefit of priority from Japanese Patent Application 2010-215333 filed on Sep. 27, 2010, the disclosures of all of which are incorporated in their entirety by reference herein.

TECHNICAL FIELD

The present invention relates to a vehicle-mounted device and a congestion control method.

BACKGROUND ART

In ITS (Intelligent Transport Systems), radio waves are used in performing intervehicle communication to exchange information between vehicles. In intervehicle communication that is carried out by using radio waves of a predetermined band, an increase in the number of vehicles that are carrying out intervehicle communication and that are present within a certain area leads to congestion of radio waves, raising the concern that communication between vehicles will become impossible.

In communication between portable telephones carried out by way of base stations, base stations typically implement control to avoid congestion. However, intervehicle communication lacks base stations carrying out control to avoid congestion. As a result, when the number of vehicles present within a certain area that are carrying out intervehicle communication increases, control must be implemented to avoid congestion between the vehicles.

WO2008/099716 (Patent Literature 1) discloses a vehicular communication device that implements control for avoiding congestion.

The vehicular communication device described in Patent Literature 1 estimates the congestion state level that indicates whether the occurrence of congestion is impending or not, based on the channel utilization factor. The channel utilization factor represents the proportion of transmitting and receiving channels that are being used.

The vehicular communication device described in Patent Literature 1, when the congestion state level is equal to or greater than a predetermined level, decreases the transmission power of its own vehicle to a value which is less than the transmission power of its own vehicle at a time of the congestion state level below the predetermined level.

SUMMARY OF THE INVENTION

Problem to be Solved by the Invention

The vehicular communication device described in Patent Literature 1, when the congestion state level is equal to or greater than the predetermined level, makes the transmission power of the vehicle less than the transmission power of the vehicle when the congestion state level falls below a predetermined level, whereby the vehicular communication device is able to avoid congestion by decreasing, of the parameters for transmission of the vehicle, the transmission power.

As a result, the vehicular communication device decreases the transmission power of its own vehicle when the congestion state level is equal to or greater than the predetermined level even in a state in which radio waves having transmission power that is greater than that of its own vehicle are being transmitted from other vehicles in the vicinity. Thus, the transmission power of its own vehicle will in some cases become far lower than the transmission power of other vehicles in the vicinity and the variation in transmission power between vehicles becomes great.

Accordingly, the problem arises that, in order to avoid congestion, the difference in parameters for communication becomes great among a plurality of vehicles.

It is therefore an object of the present invention to provide a vehicle-mounted device and congestion control method that can avoid congestion while reducing differences in parameters for communication among vehicles.

Solution to the Problem

The vehicle-mounted device according to the present invention is a vehicle-mounted device that carries out communication by means of radio signals with predetermined vehicle-mounted devices respectively mounted in a plurality of vehicles and includes:

measurement means for detecting the radio signals to measure congestion level;

reception means for receiving, from each of the predetermined vehicle-mounted devices, a value of, among parameters relating to communication of the predetermined vehicle-mounted devices, a predetermined parameter for which the degree of contribution to congestion increases with increase in the value of the predetermined parameter; and control means for decreasing, when the congestion level measured by the measurement means exceeds a predetermined threshold value, the value of the predetermined parameter of its own device when the value of the predetermined parameter of its own device is greater than the average of values of the predetermined parameter that are received by the reception means.

The vehicle-mounted device according to the present invention is a vehicle-mounted device that carries out communication by means of radio signals with predetermined vehicle-mounted devices respectively mounted in a plurality of vehicles and includes:

measurement means for detecting the radio signals to measure congestion level;

reception means for receiving, from each of the predetermined vehicle-mounted devices, a value of, among parameters relating to communication of the predetermined vehicle-mounted devices, a specific parameter for which the degree of contribution to congestion decreases with increase in the value of the specific parameter; and control means for increasing, when the congestion level measured by the measurement means exceeds a predetermined threshold value, the value of the specific parameter of its own device when the value of the specific parameter of its own device is less than the average of values of the specific parameter that are received by the reception means.

The congestion control method according to the present invention is a congestion control method of a vehicle-mounted device that performs communication by radio signals with predetermined vehicle-mounted devices respectively mounted in a plurality of vehicles and includes:

detecting the radio signals to measure congestion level;

receiving, from each of the predetermined vehicle-mounted devices, a value of, among parameters relating to communication of the predetermined vehicle-mounted devices, a predetermined parameter for which the degree of contribution to congestion increases with increase in the value of the predetermined parameter; and when the congestion level measured exceeds a predetermined threshold value, decreasing the value of the predetermined parameter of its own device when the value of the predetermined parameter of its own device are greater than the average of values of the predetermined parameter that are received.

The congestion control method according to the present invention is a congestion control method of a vehicle-mounted device that performs communication by radio signals with predetermined vehicle-mounted devices respectively mounted in a plurality of vehicles and includes:

detecting the radio signals to measure congestion level;

receiving, from each of the predetermined vehicle-mounted devices, a value of, among parameters relating to communication of the predetermined vehicle-mounted devices, a specific parameter for which the degree of contribution to congestion decreases with increase in the value of the specific parameter; and when the congestion level measured exceeds a predetermined threshold value, increasing the values of the specific parameter of its own device when the value of the specific parameter of its own device is less than the average of values of the specific parameter that are received.

Advantageous Effects of the Invention

By means of the present invention, congestion can be avoided while decreasing the differences among parameters that are used in communication among vehicles.

DESCRIPTION OF EMBODIMENTS

An exemplary embodiment of the present invention is next described with reference to the accompanying drawings.

Figure 1:
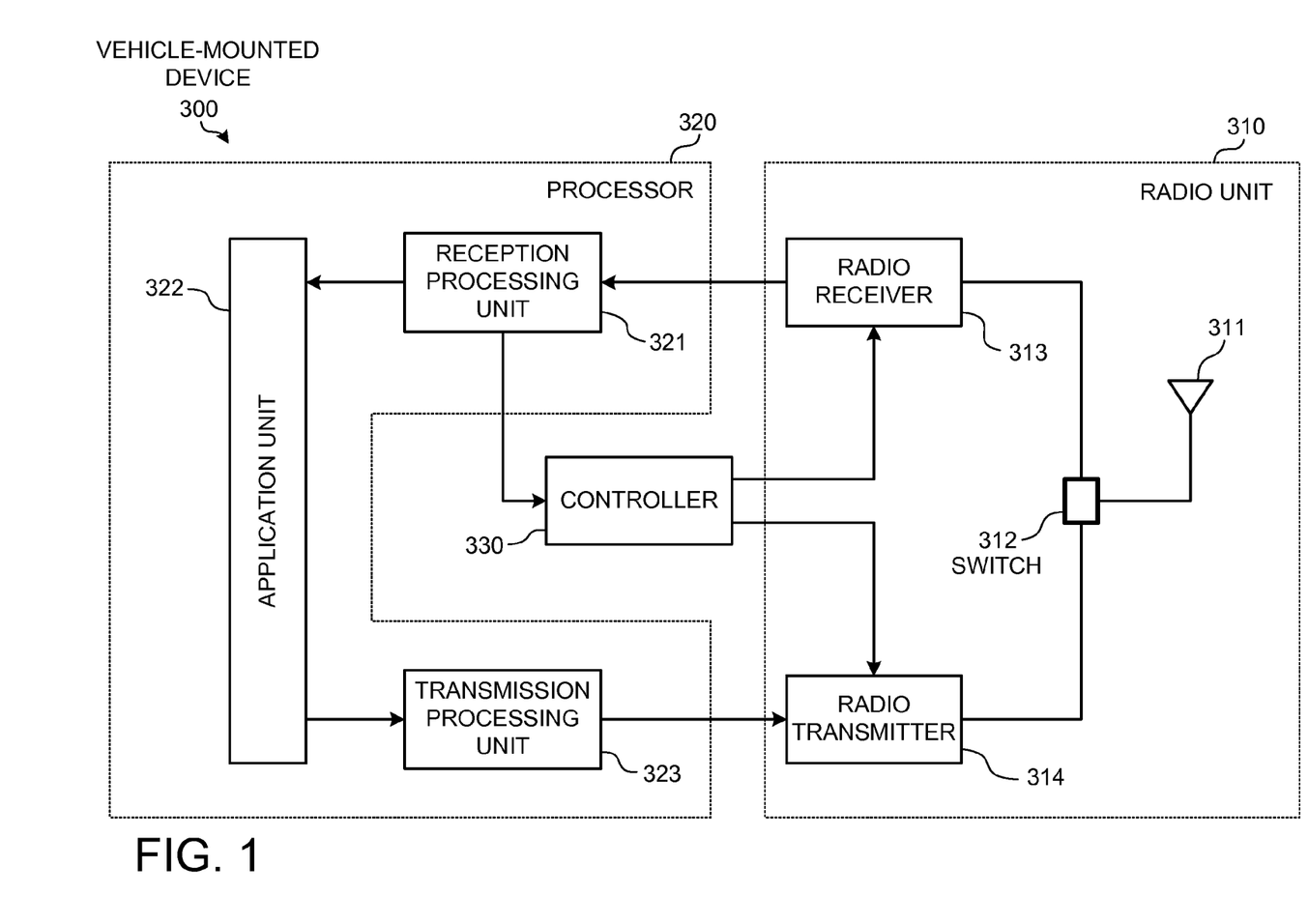
FIG. 1 is a block diagram showing an example of the configuration of a vehicle-mounted device in an exemplary embodiment of the present invention.

FIG. 1 is a block diagram showing an example of the configuration of a vehicle-mounted device in the present exemplary embodiment.

Vehicle-mounted device 300 is a vehicle-mounted device that is mounted in a vehicle. Vehicle-mounted device 300 performs communication by means of radio signals with other vehicle-mounted devices that are respectively mounted in a plurality of vehicles. The other vehicle-mounted device mounted in each of a plurality of vehicles can typically be referred to as a predetermined vehicle-mounted device. Further, the other vehicle-mounted devices have functions similar to those of vehicle-mounted device 300.

Vehicle-mounted device 300 is equipped with radio unit 310, processor 320, and controller 330. Radio unit 310 is equipped with antenna 311, switch 312, radio receiver 313, and radio transmitter 314. Processor 320 is equipped with reception processing unit 321, application unit 322, and transmission processing unit 323.

Radio unit 310 can also typically be referred to as measurement means.

Radio unit 310 detects radio signals used for performing communication with other vehicle-mounted devices to measure the congestion level. The radio signals used for performing communication with other vehicle-mounted devices are hereinbelow referred to as simply "radio signals." In addition, the congestion level is referred to as the "channel load factor."

Antenna 311 is used for transmitting or receiving packets as radio signals.

Switch 312 connects either of radio receiver 313 or radio transmitter 314 to antenna 311. Switch 312 connects radio transmitter 314 with antenna 311 only for output time intervals in which radio transmitter 314 supplies packets. Switch 312 connects radio receiver 313 with antenna 311 for intervals other than the output time intervals.

Radio receiver 313 receives radio signals by way of antenna 311. Radio receiver 313, when receiving the radio signals, acquires packets shown in the radio signals.

In addition, radio receiver 313 detects radio signals that are transmitted from vehicle-mounted device 300 and other vehicle-mounted devices. Radio receiver 313 measures the channel load factor that indicates the proportion, within a predetermined interval, of a detection interval in which radio signals are detected. Radio receiver 302 supplies the acquired packets and the measured channel load factor to reception processing unit 321.

Processor 320 can also be typically referred to as reception means.

Processor 320 receives from each of the other vehicle-mounted devices a value (dBm) of, among parameters relating to communication of the other vehicle-mounted devices, the transmission power. The transmission power is a parameter for which the degree of contribution to congestion increases with increase in the value of the parameter. The transmission power can typically be referred to as a predetermined parameter.

Processor 320 further receives, from each of the other vehicle-mounted devices, the channel load factor measured by other vehicle-mounted device.

Processor 320 further receives from each of the other vehicle-mounted devices a value of, among parameters relating to communication of the other vehicle-mounted devices, each of the reception sensitivity (dBm), the transmission communication rate (Mbps: Mega-bit per second), and the transmission spacing (ms: milliseconds). Each of the reception sensitivity, transmission communication rate, and transmission spacing is a parameter for which the degree of contribution to congestion decreases as the parameter value increases. Each of the reception sensitivity, transmission communication rate, and transmission spacing can typically be referred to as a specific parameter.

As a result, processor 320 receives from each of the other vehicle-mounted devices values of each of the transmission power, reception sensitivity, and transmission spacing of the other vehicle-mounted device and the channel load factor measured by the other vehicle-mounted device.

In the present exemplary embodiment, reception processing unit 321 extracts, of the information indicated by packets with each reception of packets from radio receiver 313, device identifiers that identify other vehicle-mounted devices, congestion information that indicates the channel load factor, and parameter information that indicates each of the transmission power value, the reception sensitivity value, the transmission communication rate value, and the transmission spacing value.

Reception processing unit 321, upon extracting the congestion information and parameter information for each of the device identifiers, supplies the device identifiers, congestion information, and parameter information to controller 330. Reception processing unit 321 supplies, to application unit 322, information indicated in packets which is other than the device identifiers, congestion information and parameter information, and such as vehicle information indicating the positions of the vehicles or the vehicle type of the other vehicle-mounted devices. In addition, reception processing unit 321, upon receiving the channel load factor measured by radio receiver 313, supplies the channel load factor to controller 330.

Controller 330 can typically be referred to as control means.

Controller 330 judges whether the channel load factor measured by radio unit 310 exceeds a judgment threshold value or not. The judgment threshold value is a threshold value for judging whether there is a high potential for the occurrence of congestion in the area in which vehicle-mounted device 300 can communicate. The judgment threshold value can typically be referred to as the predetermined threshold value.

When the channel load factor measured by radio unit 310 exceeds the judgment threshold value, controller 330 calculates the average of the values of the transmission power that are received in processor 320 and checks whether the value of the transmission power of vehicle-mounted device (its own device) 300 is greater than the average.

If the transmission power of vehicle-mounted device 300 is greater than the average of the values of the transmission power that are received in processor 320, controller 330 decreases the value of the transmission power of vehicle-mounted device 300. On the other hand, if the transmission power of vehicle-mounted device 300 is less than the average of the values of the transmission power that are received in processor 320, controller 330 does not change the value of the transmission power of vehicle-mounted device 300.

In addition, when the channel load factor measured by radio 310 exceeds the judgment threshold value, controller 330 calculates each of: the average of the values of reception sensitivity, the average of the values of transmission communication rate, and the average of the values of transmission spacing which are received from processor 320.

When the channel load factor measured by radio unit 310 exceeds the judgment threshold value, controller 330 checks whether the value of the reception sensitivity of vehicle-mounted device 300 is less than the average of the values of reception sensitivity that are received at processor 320.

When the value of the reception sensitivity of vehicle-mounted device 300 is less than the average of the values of reception sensitivity that are received in processor 320, controller 330 makes the value of the reception sensitivity of vehicle-mounted device 300 greater than the average of the values of reception sensitivity that are received at processor 320. On the other hand, when the value of reception sensitivity of vehicle-mounted device 300 is greater than the average of the values of reception sensitivity that are received in processor 320, controller 330 does not change the value of the reception sensitivity of vehicle-mounted device 300.

In addition, when the channel load factor measured by radio unit 310 exceeds the judgment threshold value, controller 330 checks whether the transmission communication rate of vehicle-mounted device 300 is smaller than the average of the values of transmission communication rate that are received in processor 320.

If the value of transmission communication rate of vehicle-mounted device 300 is less than the average of the values of the transmission communication rate that are received in processor 320, controller 330 makes the value of the transmission communication rate of vehicle-mounted device 300 greater than the average of the values of transmission communication rate that are received in processor 320. On the other hand, if the value of transmission communication rate of vehicle-mounted device 300 is greater than the average of the values of transmission communication rate that are received in processor 320, controller 330 does not change the value of the transmission communication rate of vehicle-mounted device 300.

In addition, when the channel load factor measured by radio unit 310 exceeds the judgment threshold value, controller 330 checks whether the value of the transmission spacing of vehicle-mounted device 300 is less than the average of the values of transmission spacing that are received in processor 320.

If the value of transmission spacing of vehicle-mounted device 300 is less than the average of the values of transmission spacing that are received in processor 320, controller 330 makes the value of transmission spacing of vehicle-mounted device 300 greater than the average of the values of transmission spacing that are received in processor 320. On the other hand, when the value of transmission spacing of vehicle-mounted device 300 is greater than the average of the values of transmission spacing that are received in processor 320, controller 330 does not change the value of the transmission spacing of vehicle-mounted device 300.

In the present exemplary embodiment, controller 330 receives, from reception processing unit 321, the channel load factor measured by radio receiver 313 and the parameter information and congestion information for each of other vehicle-mounted devices.

Upon receiving the channel load factor measured by radio receiver 313 and the congestion information for each of the other vehicle-mounted devices, controller 330 calculates the average of the channel load factor indicated by the respective items of congestion information, and judges whether either of the average of the channel load factors of the other vehicle-mounted devices and the channel load factor measured by radio receiver 313 exceeds the judgment threshold value. A value that indicates, for example, 40% may be used as the judgment threshold value. Alternatively, a value that differs from 40% may also be used as the judgment threshold value.

When neither the channel load factor measured by radio receiver 313 nor the average of the channel load factors of the other vehicle-mounted devices exceeds the judgment threshold value, controller 330 does not change any of the values of transmission power, reception sensitivity, transmission communication rate, or transmission spacing of vehicle-mounted device 300.

On the other hand, when either of the channel load factor measured by radio receiver 313 or the average of the channel load factors of the other vehicle-mounted devices exceeds the judgment threshold value, controller 330 compares the parameter of vehicle-mounted device 300 with the parameter indicated by each item of parameter information for each of the parameters of transmission power, reception sensitivity, transmission communication rate, and transmission spacing.

For example, when either of the channel load factor measured by radio receiver 313 or the average of the channel load factors of other vehicle-mounted devices exceeds the judgment threshold value, controller 330 makes the value of the transmission power of vehicle-mounted device 300 lower than the average of the values of transmission power that are indicated by the respective items of parameter information when the value of the transmission power of vehicle-mounted device 300 is greater than the average of the values of transmission power indicated by respective items of parameter information.

Because a state is considered in which the initial values of the transmission values of other vehicle-mounted devices are the same and the values of the transmission power of other vehicle-mounted devices have not changed from the initial state, vehicle-mounted device 300 makes the value of the transmission power of its own device lower than the average rather than making the transmission power of its own device the average. When the value of the transmission power of vehicle-mounted device 300 were set to the average in this state, the transmission power of vehicle-mounted device 300 and other vehicle-mounted devices would all be the same and none of the vehicle-mounted devices would decrease the value of the transmission power of its own device even when the congestion state is not cancelled. As a result, controller 330 makes the value of the transmission power of vehicle-mounted device 300 not the average but a value that is lower than the average. In addition, the reason that vehicle-mounted device 300 makes the value of the parameter of its own device not the average, but rather, a value greater than the average for the parameter of each of the reception sensitivity, the transmission communication rate, and the transmission spacing is that a case is taken into consideration in which the initial values of the parameter of the other vehicle-mounted devices are identical and the values of the parameter of the other vehicle-mounted devices have not changed from the initial values.

When the value of the transmission power of vehicle-mounted device 300 is greater than the average of the values of the transmission power indicated by the parameter information, controller 330 makes the value of the transmission power of vehicle-mounted device 300 lower by a predetermined value than the average. More specifically, when the value of the transmission power of radio transmitter 314 is greater than the average, controller 330 supplies transmission power information that indicates a value slightly lower than the average to radio transmitter 314. Radio transmitter unit 314, upon receiving the transmission power information from controller 330, sets the transmission power to the value indicated by the transmission power information.

In addition, when the value of the reception sensitivity of vehicle-mounted device 300 is lower than the average of the values of reception sensitivity indicated by the parameter information, controller 330 makes the value of reception sensitivity of vehicle-mounted device 300 greater than the average by a predetermined value. More specifically, when the value of the reception sensitivity of radio receiver 313 is lower than the average, controller 330 supplies reception sensitivity information indicating a value that is slightly greater than the average to radio receiver 313. Upon receiving the reception sensitivity information from controller 330, radio receiver 313 sets the reception sensitivity to the value indicated by the reception sensitivity information.

Controller 330 may make the value of the transmission power of vehicle-mounted device 300 smaller than the average even when the value of the transmission power of vehicle-mounted device 300 and the average of the values of transmission power indicated by the items of parameter information are the same. In this case, even in a state in which the initial values of transmission power of vehicle-mounted device 300 and other vehicle-mounted devices are the same and the values of each of the transmission powers has not been changed from the initial values, any one of the vehicle-mounted devices is able to reduce the transmission power of its own device when the channel load factor exceeds the judgment threshold value. In addition, for each of the parameters of reception sensitivity, transmission communication rate, and transmission spacing, controller 330 may make the value of the parameter of vehicle-mounted device 300 greater than the average even when the value of the parameter of vehicle-mounted device 300 is the same as the average of the values of the parameter indicated by the parameter information.

After either of the channel load factor measured by radio receiver 313 or the average of the channel load factors indicated by items of congestion information exceeds the judgment threshold value and controller 330 decreases the value of the transmission power of vehicle-mounted device 300, controller 330 checks whether either of the channel load factor measured by radio receiver 313 or the average of the channel load factors indicated by items of congestion information exceeds a cancellation threshold value. The cancellation threshold value is a value for cancelling congestion control and is a threshold value lower than the judgment threshold value. The cancellation threshold value can also typically be referred to as the specific threshold value.

If, after decreasing the value of the transmission power of vehicle-mounted device 300, neither of the channel load factor measured by radio receiver 313 nor the average of the channel load factors indicated by the items of congestion information exceeds the cancellation threshold value, controller 330 increases the value of the transmission power of vehicle-mounted device 300.

For example, if, after decreasing the value of the transmission power of vehicle-mounted device 300, neither the congestion level that is measured by radio receiver 313 nor the average of the congestion levels indicated by the items of congestion information exceeds the cancellation threshold value, controller 330 returns the value of the transmission power to the value (hereinbelow referred to as the "reference value") that immediately preceded the decrease of the transmission power of vehicle-mounted device 300.

When returning the value of the transmission power of vehicle-mounted device 300 to the reference value, the possibility exists that the state will return to the congestion state immediately after the change if the transmission power of vehicle-mounted device 300 returns to the reference value in a single change. Therefore, controller 330 may increase the value of the transmission power of vehicle-mounted device 300 to the reference value in stages.

If neither the channel load factor measured by radio receiver 313 nor the average of channel load factors indicated by the items of congestion information exceeds the cancellation threshold value after the value of the reception sensitivity of vehicle-mounted device 300 has been increased, controller 330 decreases the value of the reception sensitivity of vehicle-mounted device 300. For example, controller 330 may reduce the value of the reception sensitivity of vehicle-mounted device 300 to the reference value of the reception sensitivity in stages.

If neither the channel load factor measured by radio receiver 313 nor the average of the channel load factors indicated by the items of congestion information exceeds the cancellation threshold value after controller 330 has increased the value of the transmission communication rate of vehicle-mounted device 300, controller 330 decreases the value of the transmission communication rate of vehicle-mounted device 300. For example, controller 330 may decrease the value of the transmission communication rate of vehicle-mounted device 300 to the reference value of the transmission communication rate in stages.

If neither the channel load factor measured by radio receiver 313 nor the average of the channel load factors indicated by the items of congestion information exceeds the cancellation threshold value after controller 330 has increased the value of the transmission spacing of vehicle-mounted device 300, controller 330 decreases the value of the transmission spacing of vehicle-mounted device 300. For example, controller 330 may decrease the value of the transmission spacing of vehicle-mounted device 300 to the reference value of transmission spacing in stages.

When returning the value of the reception sensitivity, transmission communication rate, or transmission spacing of vehicle-mounted device 300 to the reference value in a single change, the possibility exists of a return to the congestion state immediately after the change. As a result, controller 330 may decrease the value of the reception sensitivity, transmission communication rate, or transmission spacing of vehicle-mounted device 300 to the reference value in stages.

Controller 330 further supplies to radio transmitter 314 its own vehicle's congestion information that indicates the channel load factor measured by radio receiver 313 and its own vehicle's parameter information that indicates the value of the transmission power, the value of the reception sensitivity, the value of the transmission communication rate, and the value of the transmission spacing of vehicle-mounted device 300.

Application unit 322 receives from reception processing unit 321 information (such as vehicle information) that is indicated in packets other than the congestion information and parameter information. Upon receiving, for example, the vehicle information, application unit 322 executes predetermined processing. Application unit 322 executes the predetermined processing to generate transmission information.

Application unit 322, upon generating transmission information, supplies the transmission information to transmission processing unit 323.

Transmission processing unit 323, upon receiving transmission information from application unit 322, converts the transmission information to packets. Wireless processing unit 323 supplies the converted packets to radio transmitter 314.

Radio transmitter 314 transmits its own vehicle's congestion information and its own vehicle's parameter information to other vehicle-mounted devices.

In the present exemplary embodiment, upon receiving its own vehicle's congestion information and its own vehicle's parameter information from controller 330, radio transmitter 314 stores the device identifier that identifies vehicle-mounted device 300, its own vehicle's congestion information, and its own vehicle's parameter information in the packet header portion and transmits a packet that stores the device identifier, its own vehicle's congestion information, and its own vehicle's parameter information via antenna 311.

For example, upon receiving a packet from transmission processing unit 323, radio transmitter 314 supplies as output a packet in which are stored the device identifier, its own vehicle's congestion information, and its own vehicle's parameter information by transmission power of the value indicated by transmission power information received from controller 330.

Figure 2:
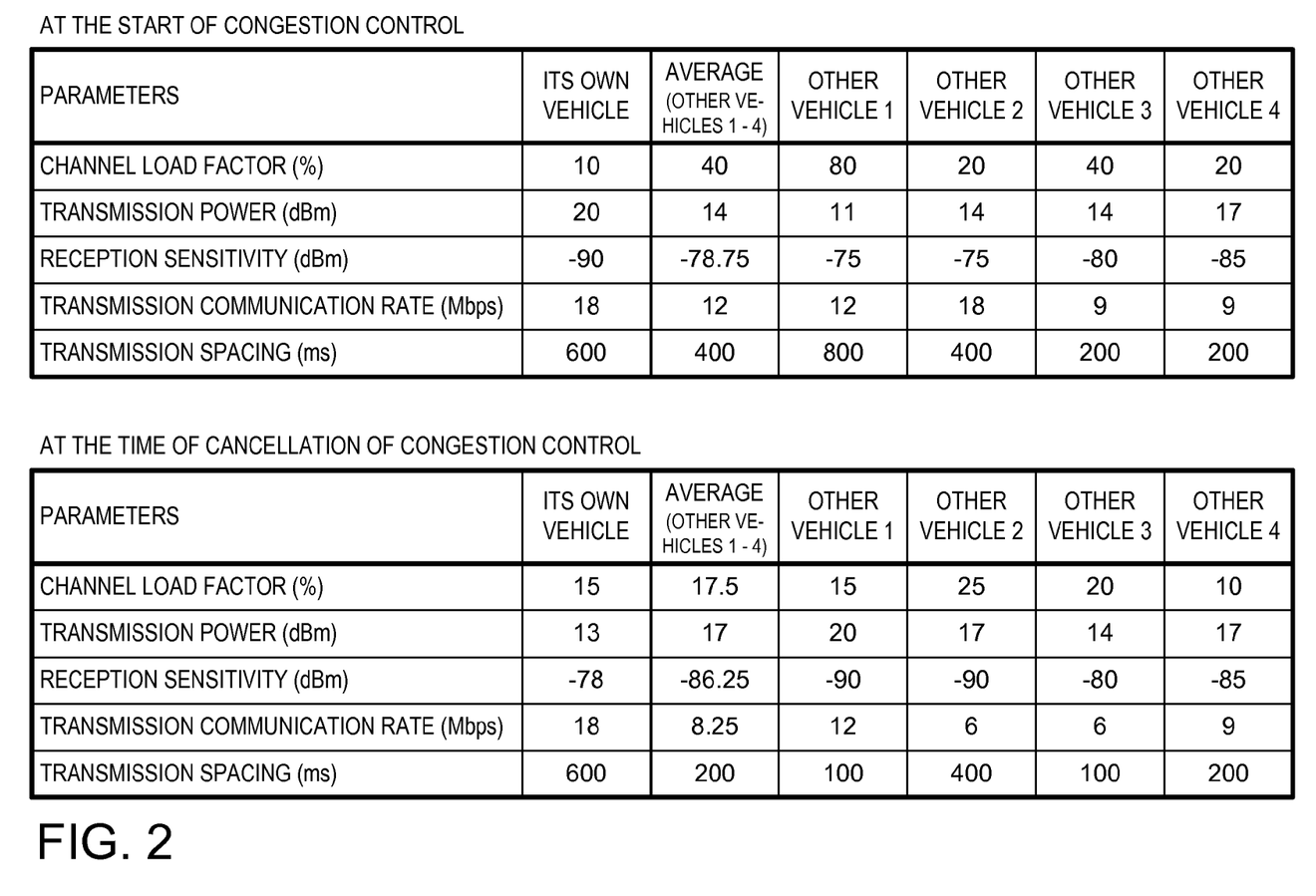
FIG. 2 shows examples of communication parameters used in the congestion control.

FIG. 2 is a view illustrating the congestion control operations realized by vehicle-mounted device 300.

FIG. 2 shows the channel load factor, transmission power, reception sensitivity, transmission communication rate, and transmission spacing as the parameters used in congestion control. The transmission power, reception sensitivity, transmission communication rate, and transmission spacing are parameters for communication that are prescribed in ETSI (European Telecommunications Standards Institute) TS (Technical Specification) 102 687.

In FIG. 2, vehicle-mounted device 300 mounted in its own vehicle periodically receives the congestion information of other vehicle-mounted devices and the parameter information of other vehicle-mounted devices, from other vehicle-mounted devices respectively mounted in other vehicles 1 to 4. FIG. 2 shows the values of the parameters of its own vehicle, the values of the parameters of each of other vehicles 1 to 4, and the averages of the values of the parameters of other vehicles 1 to 4. In addition, in this example, the judgment threshold value is assumed to be set at 40% and the cancellation threshold value is assumed to be set at 20%.

At the start of congestion control, the channel load factor of its own vehicle is 10% and performance of congestion control has not yet been reached. However, upon taking the average of the channel load factors of other vehicles 1 to 4, the average becomes 40%, whereby the average exceeds the judgment threshold value. As a result, vehicle-mounted device 300 performs congestion control.

In congestion control, vehicle-mounted device 300 compares the parameter of its own vehicle and the average of the values of the parameter of other vehicles 1 to 4 for each of the parameters of the transmission power, reception sensitivity, transmission communication rate, and transmission spacing of its own device.

In FIG. 2, the value of the transmission power of its own vehicle is greater than the average of the values of the transmission power of other vehicles 1 to 4 and the value of the reception sensitivity of its own vehicle is less than the average of the values of reception sensitivity of other vehicles 1 to 4. As a result, it is judged that the transmission power of 20 dBm and the reception sensitivity of −90 dBm of its own vehicle make a significant contribution to congestion.

Accordingly, vehicle-mounted device 300 changes each of the value of transmission power and the value of reception sensitivity by a predetermined value from the average in the direction that prevents the occurrence of congestion. Regarding the contribution to congestion, the degree of contribution to congestion increases with increase in the value of the transmission power. In contrast, the degree of contribution to congestion increases with decrease of the value of the reception sensitivity, the transmission communication rate, or the transmission spacing.

Therefore, vehicle-mounted device 300 sets the value of the transmission power to a value of 13 dBm that is slightly lower than the average of 14 dBm and sets the value of reception sensitivity to −78.00 dBm that is slightly greater than the average of −78.75 dBm.

At the time of cancellation of congestion control, the channel load factor of its own vehicle is 15%, the average of the channel load factors of the other vehicles 1 to 4 is 17.5%, and neither the channel load factor of its own vehicle nor the average exceeds the cancellation threshold value. As a result, vehicle-mounted device 300 performs the process of cancelling congestion control.

In the process of cancelling congestion control, vehicle-mounted device 300 returns the value of each of the transmission power and reception sensitivity of its own vehicle to the reference value that immediately preceded the start of congestion control.

Figure 3:
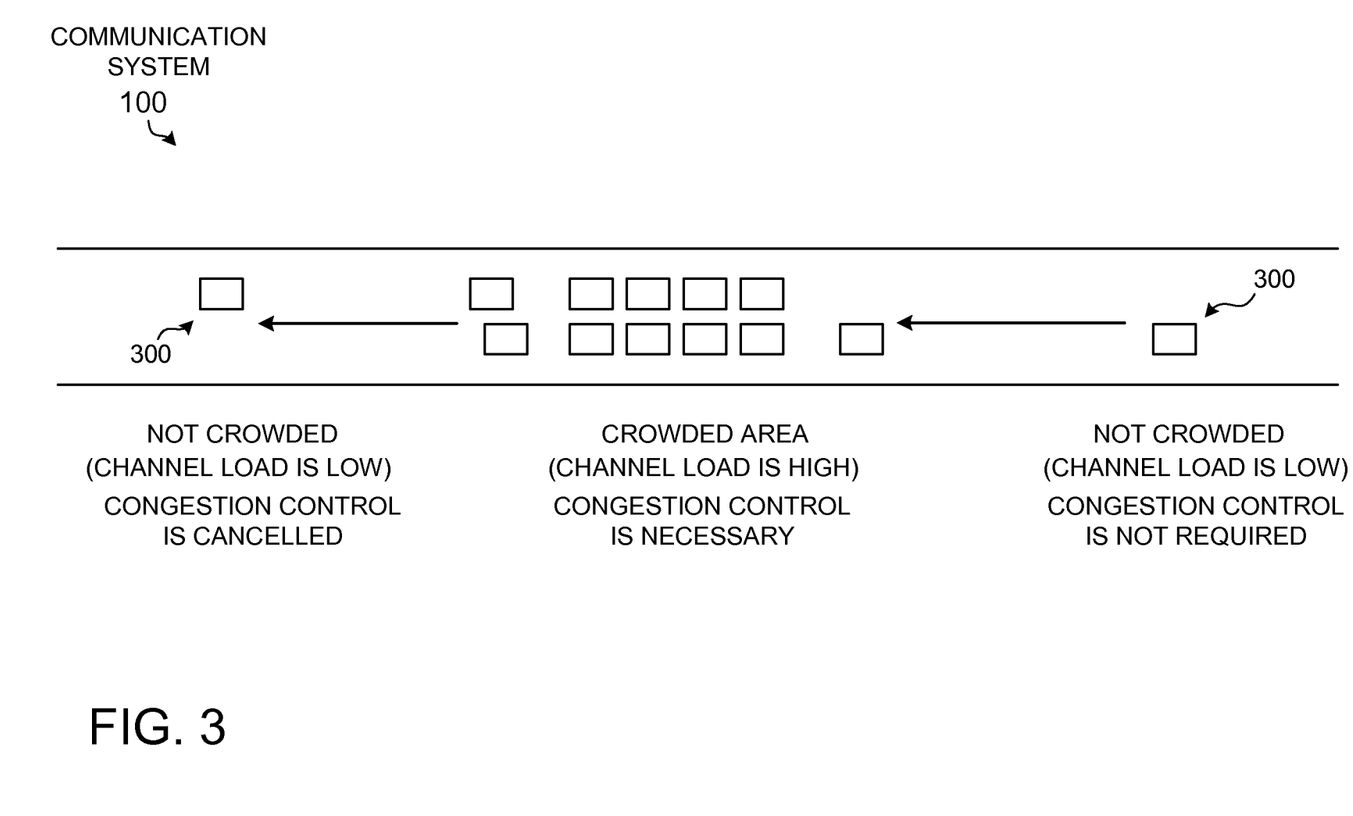
FIG. 3 is a view for describing a communication system including a plurality of vehicle-mounted devices 300.

FIG. 3 shows a situation in which congestion control by vehicle-mounted device 300 is necessary.

FIG. 3 shows communication system 100 that includes a plurality of vehicle-mounted devices 300 and a crowded area in which congestion control must be performed.

As shown in FIG. 3, when the vehicle in which vehicle-mounted device 300 is mounted enters a crowded area, the radio band used in intervehicle communication becomes congested and the concern arises that intervehicle communication will become impossible. Vehicle-mounted device 300 of a vehicle that has entered into the crowded area (hereinbelow referred to as "vehicle-mounted device in the crowded area") receives congestion information and parameter information from each of the other vehicle-mounted devices within the crowded area and judges whether either of the channel load factor measured by vehicle-mounted device 300 or the average of the channel load factors indicated by the congestion information exceeds the judgment threshold value.

When either of the channel load factor measured by vehicle-mounted device 300 or the average of channel load factors indicated by the congestion information exceeds the judgment threshold value, vehicle-mounted device 300 in the crowded area compares the parameter value of its own device with the average of the parameter values of other vehicle-mounted devices for each of the parameters of transmission power, reception sensitivity, transmission communication rate, and transmission spacing.

When the value of transmission power of its own vehicle is greater than the average of the values of transmission power of the other vehicle-mounted devices, vehicle-mounted device 300 in the crowded area makes the value of the transmission power of vehicle-mounted device 300 lower than the average of the values of transmission power of the other vehicle-mounted devices. When the value of transmission power is decreased, the transmission range that the transmitted wireless signals reach shrinks, whereby the number of vehicles with which communication is possible decreases and the congestion is mitigated.

When the value of reception sensitivity of its own vehicle is lower than the average of the values of reception sensitivity of the other vehicle-mounted devices, vehicle-mounted device 300 in the crowded area makes the value of reception sensitivity of vehicle-mounted device 300 greater than the average of the values of reception sensitivity of the other vehicle-mounted devices. When the value of reception sensitivity increases, the reception range in which wireless signals can be received shrinks, whereby the number of vehicles with which communication is possible decreases and congestion is mitigated.

When the value of transmission communication rate of its own vehicle is lower than the average of the values of the transmission communication rate of other vehicle-mounted devices, vehicle-mounted device 300 in the crowded area makes the value of transmission communication rate of vehicle-mounted device 300 greater than the average of the values of transmission communication rate of the other vehicle-mounted devices. When the value of transmission communication rate increases, the transmission power per bit of radio signals decreases, whereby the number of vehicles with which communication is possible decreases and congestion is mitigated.

When the value of transmission spacing of its own vehicle is lower than the average of the values of transmission spacing of the other vehicle-mounted devices, vehicle-mounted device 300 in the crowded area makes the value of transmission spacing of vehicle-mounted device 300 greater than the average of the values of transmission spacing of the other vehicle-mounted devices. When the value of transmission spacing increases, the time taken up by packets per unit time becomes shorter and the congestion is therefore moderated.

After the value of transmission power of its own vehicle has been decreased or after the value of the reception sensitivity, transmission communication rate, or transmission spacing of its own vehicle has been increased, vehicle-mounted device 300 in the crowded area leaves the crowded area. Vehicle-mounted device 300 that is outside the crowded area subsequently receives congestion information and parameter information from each of the other vehicle-mounted devices that are outside the crowded area and then judges whether either of the channel load factor measured by its own device or the average of channel load factors indicated by congestion information exceeds the cancellation threshold value.

If neither of the channel load factor measured by vehicle-mounted device 300 nor the average of the channel load factors indicated by the congestion information exceeds the cancellation threshold value after the value of the transmission power of its own device was decreased, vehicle-mounted device 300 that is outside the crowded area returns the value of the transmission power of its own device to the reference value that immediately preceded the decrease of the value of the transmission power.

Therefore, in communication system 100 that includes predetermined vehicle-mounted devices respectively mounted in a plurality of vehicles and vehicle-mounted device 300 performing communication by radio signals with the predetermined vehicle-mounted devices, each of the predetermined vehicle-mounted devices transmits to the vehicle-mounted device the value of, among parameters relating to communication of the predetermined vehicle-mounted devices, a predetermined parameter for which the degree of contribution to congestion increases with increase in the values of the predetermined parameter. Vehicle-mounted device 300 includes: a radio unit detecting radio signals to measure the congestion level; a processor receiving from the respective predetermined vehicle-mounted devices the values of the predetermined parameter of the predetermined vehicle-mounted devices; and a controller decreasing the value of the predetermined parameter of its own device when the congestion level measured by the radio unit exceeds a predetermined threshold value and the value of predetermined parameter of its own device are greater than the average of the values of the predetermined parameter received in the processor.

Figure 4:
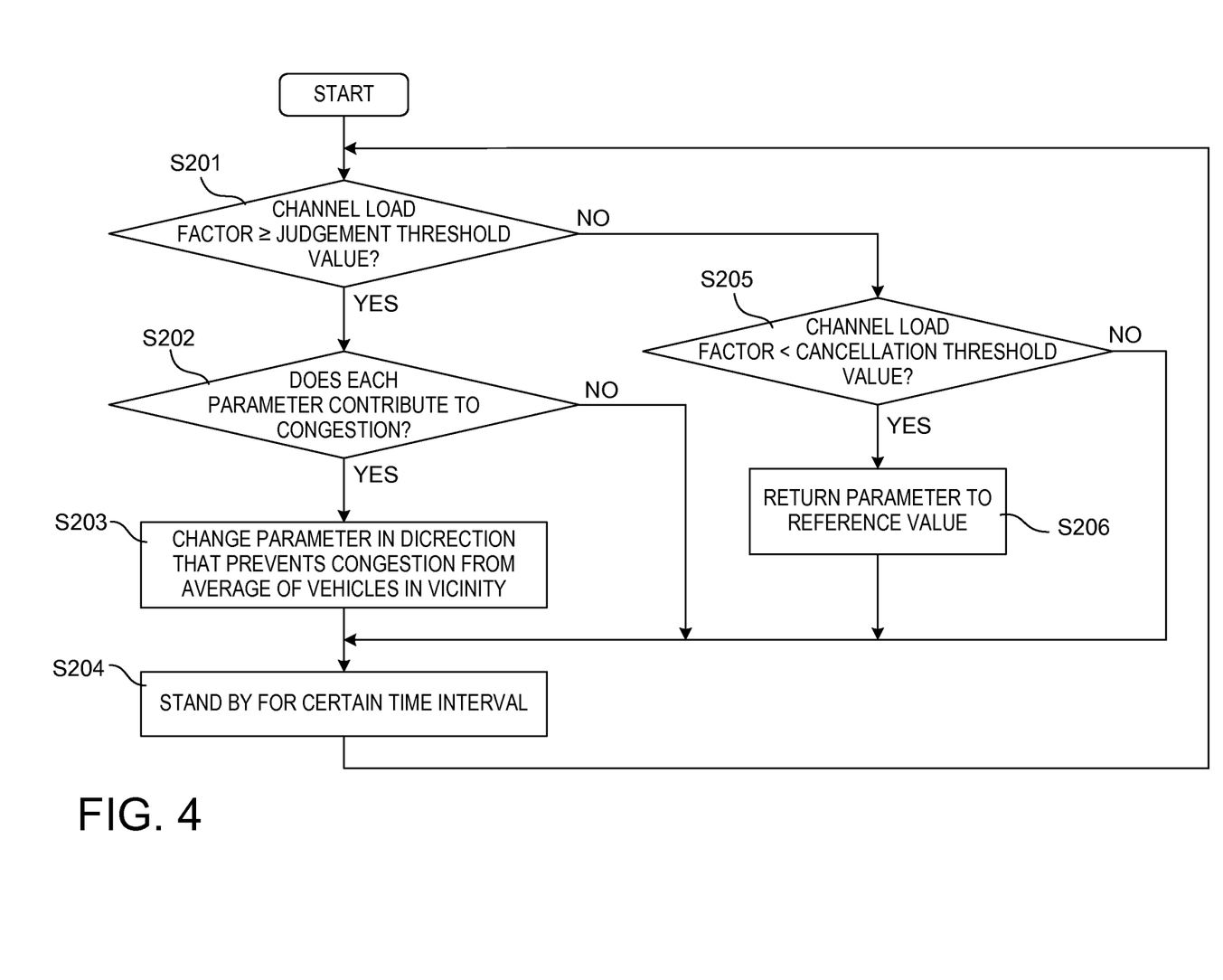
FIG. 4 is a flow chart showing an example of the processing procedures of the congestion control method of vehicle-mounted device 300.

FIG. 4 is a flow chart showing an example of the processing procedure of the congestion control method of vehicle-mounted device 300.

First, when radio unit 310 detects a radio signal and measures the channel load factor and processor 320 receives the channel load factor and parameter information for each of other vehicle-mounted devices, controller 330 judges whether either the channel load factor measured by radio unit 310 or the average of the channel load factors of the other vehicle-mounted devices exceeds a judgment threshold value (Step S201).

When either of the channel load factor measured by radio unit 310 or the average of the channel load factors of the other vehicle-mounted devices exceeds the judgment threshold value, controller 330 verifies whether each of the value of the transmission power, the value of reception sensitivity, the value of transmission communication rate, and the value of transmission spacing of vehicle-mounted device 300 makes a large contribution to congestion or not (Step S202). In the present exemplary embodiment, controller 330 verifies whether the value of the transmission power of vehicle-mounted device 300 is greater than the average of the values of transmission power of the other vehicle-mounted devices or not. Regarding each of the parameters of the reception sensitivity, transmission communication rate, and transmission spacing, controller 330 verifies whether the value of the parameter of vehicle-mounted device 300 is greater than the average of the values of the parameter of the other vehicle-mounted devices.

When, among the parameters relating to communication of vehicle-mounted device 300, there is a parameter making a significant contribution to congestion, controller 330 changes the value of that parameter in a direction that mitigates congestion (Step S203). In the present exemplary embodiment, when the value of the transmission power of vehicle-mounted device 300 is greater than the average of the values of transmission power of the other vehicle-mounted devices, controller 330 makes the value of the transmission power of vehicle-mounted device 300 lower than the average. In contrast, regarding each of the parameters of reception sensitivity, transmission communication rate, and transmission spacing, when the value of the parameter of vehicle-mounted device 300 is lower than the average of the values of the parameter of the other vehicle-mounted devices, controller 330 makes the value of the parameter of vehicle-mounted device 300 greater than the average.

Upon changing the value of a parameter in the direction that mitigates congestion, controller 330 stands by until a certain time period has elapsed from changing the value of the parameter of vehicle-mounted device 300 (Step S204), and when the certain time period has elapsed, returns to Step S201.

On the other hand, when there are no parameter that is making a contribution to congestion among the parameters relating to communication of vehicle-mounted device 300, controller 330 returns to Step S201 after the passage of a certain time period without changing the values of parameters relating to communication of vehicle-mounted device 300 (Step S204).

In addition, in the process of Step S201, when neither the channel load factor measured by radio unit 310 nor the average of the channel load factors of the other vehicle-mounted devices exceeds the judgment threshold value, controller 330 judges whether both the channel load factor measured by radio unit 310 and the average of the channel load factors of the other vehicle-mounted devices fall below a cancellation threshold value (Step S205).

It should be noted that, exceeding the judgment threshold value by "one" of the channel load factor measured by radio unit 310 and the average of the channel load factors of the other vehicle-mounted devices in Step S201 is taken as a condition, and failure to exceed the cancellation threshold value by "both" the channel load factor measured by radio unit 310 and the average of the channel load factors of the other vehicle-mounted devices in Step S205 is taken as a condition. By means of these conditions, the time interval from changing the value of a parameter in the direction that mitigates congestion by means of congestion control until the cancellation of congestion control can be made as long as possible and suppression of fluctuation of the channel load factor can be facilitated.

When both of the channel load factor measured by radio unit 310 and the average of the channel load factors of the other vehicle-mounted devices fall below the cancellation threshold value after the value of a parameter has been changed in the direction of mitigating congestion, controller 330 returns the value of the parameter that was changed to a reference value that immediately preceded the change (Step S206). For example, when both of the channel load factor measured by radio unit 310 and the average of the channel load factors of the other vehicle-mounted devices fall below the cancellation threshold value after the value of transmission power of vehicle-mounted device 300 has been decreased, controller 330 returns the value of the transmission power of vehicle-mounted device 300 to the reference value.

In vehicle-mounted device 300, the processing procedure of the series from Step S201 to Step S206 is repeated until the congestion control method ends.

According to the present exemplary embodiment, radio unit 310 detects radio signals to measure congestion level, and processor 320 receives from each of the predetermined vehicle-mounted devices the value of, among parameters that relate to communication of the predetermined vehicle-mounted devices, a predetermined parameter (for example, transmission power) for which the degree of contribution to congestion increases with increase in the value of the predetermined parameters. Then, when the congestion level measured by radio unit 310 exceeds a judgment threshold value, controller 330 decreases the value of the predetermined parameter of vehicle-mounted device 300 when the value of the predetermined parameter of vehicle-mounted device 300 is greater than the average of the values of the predetermined parameter received in processor 320.

As a result, when the potential for the occurrence of congestion rises, vehicle-mounted device 300 judges that the predetermined parameter of vehicle-mounted device 300 is making a large contribution to the occurrence of congestion when the value of the predetermined parameter of vehicle-mounted device 300 is greater than the average of the predetermined parameter of the other vehicle-mounted devices and makes the value of the predetermined parameter of vehicle-mounted device 300 more similar to the average of the values of the predetermined parameter of the other vehicle-mounted devices. On the other hand, even when the potential for the occurrence of congestion is high, if the value of the predetermined parameter of vehicle-mounted device 300 is lower than the average of the values of the predetermined parameter of the other vehicle-mounted devices, vehicle-mounted device 300 judges that the predetermined parameter of vehicle-mounted device 300 is not making an important contribution to congestion and therefore does not change the value of the predetermined parameter of vehicle-mounted device 300.

Accordingly, in order to avoid congestion, vehicle-mounted device 300 decreases the value of the predetermined parameter of its own device when vehicle-mounted device 300 is making a large contribution to congestion compared with vehicles in the vicinity and does not change the value of the predetermined parameter of its own device when vehicle-mounted device 300 is not making a large contribution to congestion compared to vehicles in the vicinity. As a result, in order to avoid congestion, the value of the predetermined parameter of its own device is reduced beginning from, among a plurality of vehicle-mounted devices 300, vehicle-mounted device 300 having the predetermined parameter for which the degree of contribution to congestion is large.

Thus, according to the present exemplary embodiment, vehicle-mounted devices 300 are able to avoid congestion while reducing the differences between the values of parameters for communication among vehicles. As a result, the values of parameters for communication among vehicles that are present within an area having a high potential for the occurrence of congestion can decreased with good balance and the occurrence of congestion can be avoided.

In the present exemplary embodiment, when the value of the predetermined parameter of vehicle-mounted device 300 is greater than the average, controller 330 makes the value of the predetermined parameter of vehicle-mounted device 300 lower than the average.

As a result, vehicle-mounted device 300 decreases the value of the predetermined parameter of its own device taking as a reference the average of the values of the predetermined parameter of a plurality of other vehicle-mounted devices that are present in the vicinity, whereby the values of the predetermined parameter of each vehicle can be reduced with good overall balance.

Vehicle-mounted device 300 makes the value of the predetermined parameter of its own device lower than the average rather than the average itself in consideration of a state in which the initial values of the predetermined parameter of the other vehicle-mounted devices are identical and the values of each predetermined parameter have not been changed from the initial values. For example, in a state in which the congestion level exceeds the judgment threshold value and the congestion state is not resolved when the predetermined parameter of vehicle-mounted device 300 is set to the average, the predetermined parameter of vehicle-mounted device 300 and the other vehicle-mounted devices all become the same value and each of the vehicle-mounted devices therefore becomes unable to further reduce the value of the predetermined parameter. Accordingly, vehicle-mounted device 300, by making the value of the predetermined parameter of its own device lower than the average, enables a resolution of the above-described problem.

In the present exemplary embodiment, processor 320 further receives, from each of the predetermined vehicle-mounted device, congestion level measured by the predetermined vehicle-mounted device. When processor 320 receives the congestion levels, controller 330 decreases the value of the predetermined parameter of its own device when either the congestion level measured by radio unit 310 or the average of the congestion levels received in processor 320 exceeds the judgment threshold value.

Upon receiving the congestion level from each of the other vehicle-mounted devices, vehicle-mounted device 300 judges that vehicle-mounted device 300 itself is present within the communication area of vehicle-mounted devices that are the transmission origins of the congestion levels. Therefore, vehicle-mounted device 300 is able to judge whether the average of the congestion levels received in processor 320 exceeds the judgment threshold value to determine whether vehicle-mounted device 300 itself is contributing to the congestion in the communication area of the transmission-origin vehicle-mounted devices.

As a result, when vehicle-mounted device 300 is contributing to congestion in the communication area of the transmission-origin vehicle-mounted device, vehicle-mounted device 300 decreases the value of a predetermined parameter of vehicle-mounted device 300 when the value of the predetermined parameter of its own device is greater than the average of the predetermined parameter of other vehicle-mounted devices and can thus mitigate congestion in the communication area of the transmission-origin vehicle-mounted devices.

According to the present exemplary embodiment, processor 320 receives from each of the predetermined vehicle-mounted devices the value of, among parameters that relate to communication of predetermined vehicle-mounted devices, a specific parameter (such as the reception sensitivity, transmission communication rate, or transmission spacing) for which the degree of contribution to congestion decreases with increase in the value of the specific parameter. Controller 330 then, when the congestion level measured by radio unit 310 exceeds the judgment threshold value, increases the value of the specific parameter of vehicle-mounted device 300 when the value of the specific parameter of vehicle-mounted device 300 are lower than the average of the values of the specific parameter received in processor 320.

When the potential for the occurrence of congestion increases and the value of a specific parameter of vehicle-mounted device 300 is less than the average of the specific parameter of the other vehicle-mounted devices, vehicle-mounted device 300 judges that the specific parameter of vehicle-mounted device 300 is contributing greatly to the occurrence of congestion and makes the value of the specific parameter of vehicle-mounted device 300 similar to the average of the values of the specific parameter of the other vehicle-mounted devices. On the other hand, even when the potential for the occurrence of congestion is high, if the value of a specific parameter of vehicle-mounted device 300 is less than the average of the values of the specific parameter of other vehicle-mounted devices, vehicle-mounted device 300 judges that the specific parameter of vehicle-mounted device 300 is not making a great contribution to congestion and therefore does not change the value of the specific parameter of vehicle-mounted device 300.

Accordingly, vehicle-mounted device 300 increases the value of a specific parameter of its own device when its own device is making a great contribution to congestion compared to vehicles in the vicinity and does not change the value of the specific parameter of its own device when its own device is not making a great contribution to congestion compared to vehicles in the vicinity. As a result, in order to avoid congestion, the value of the specific parameter of its own device is decreased starting from, among a plurality of vehicle-mounted devices 300, vehicle-mounted device 300 having the specific parameter for which the degree of contribution to congestion is great.

According to the present exemplary embodiment, vehicle-mounted device 300 is able to avoid congestion while reducing differences between parameters for communication among vehicles.

In addition, in the present exemplary embodiment, when the value of a specific parameter of vehicle-mounted device 300 is smaller than the average, controller 330 makes the value of the specific parameter of vehicle-mounted device 300 greater than the average.

Accordingly, vehicle-mounted device 300 increases the value of the specific parameter of its own device with the average of the values of the specific parameter of a plurality of other vehicle-mounted devices that are present in the vicinity as a reference, whereby the value of the specific parameter of each vehicle can be increased with good overall balance.

Vehicle-mounted device 300 makes the value of the specific parameter of its own device greater than the average and not the average in consideration of a state in which the initial values of the specific parameter of other vehicle-mounted devices are identical and the values of each specific parameter have not changed from the initial values. For example, in a state in which the congestion level exceeds the judgment threshold value and the congestion state is not resolved when the value of the specific parameter of vehicle-mounted device 300 is set to the average, all of the specific parameters of vehicle-mounted device 300 and the other vehicle-mounted devices are the same values and each vehicle-mounted device therefore becomes unable to further increase the value of the specific parameter. Therefore, vehicle-mounted device 300 makes the value of the specific parameter of its own device greater than the average and thus is able to resolve the above-described problem.

In the present exemplary embodiment, processor 320 receives from each of the predetermined vehicle-mounted devices (the other vehicle-mounted devices) a value of, among parameters that relate to communication of the predetermined vehicle-mounted devices, the specific parameter and a value of the predetermined parameter. When the congestion level measured by radio unit 310 exceeds the judgment threshold value, controller 330 decreases the value of the predetermined parameter of it own device when the value of the predetermined parameter of its own device re greater than the average of the values of the predetermined parameter that are received in processor 320. Controller 330 further, when the congestion level measured by radio unit 310 exceeds the judgment threshold value, increases the value of the specific parameter of its own device when the value of the specific parameter of its own device are lower than the average of the values of the specific parameter that are received in processor 320.

Accordingly, vehicle-mounted device 100 is able to avoid congestion by using both the predetermined parameter for which the degree of contribution to congestion increases with increase in the value of the predetermined parameter and the specific parameter for which the degree of contribution to congestion decreases with increase in the value of the specific parameter.

In the present exemplary embodiment, the transmission power is used as the predetermined parameter and at least one of the reception sensitivity, transmission communication rate, and transmission spacing is used as the specific parameter.

When vehicle-mounted device 300, for example, decreases the value of transmission power, the area reached by the radio signals transmitted by its own device becomes smaller and the number of other vehicle-mounted devices that can communicate decreases, whereby congestion is mitigated.

Alternatively, when vehicle-mounted device 300 increases the value of the reception sensitivity, the area in which radio signals transmitted from other vehicle-mounted devices can be received becomes smaller, whereby the number of other vehicle-mounted devices that can communicate decreases and congestion can be mitigated. Alternatively, when vehicle-mounted device 300 increases the value of the transmission communication rate, the minimum power required for receiving radio signals transmitted by vehicle-mounted device 300 in transmission-destination vehicle-mounted devices increases, whereby the number of other vehicle-mounted devices that can communicate decreases and congestion can be mitigated. Alternatively, when vehicle-mounted device 300 increases the value of transmission spacing, the time taken by packets per unit time is shortened, whereby congestion can be mitigated.

Although explanation has been presented regarding examples using, of parameters related to communication of vehicle-mounted device 300, transmission power, reception sensitivity, transmission communication rate, and transmission spacing in the present exemplary embodiment, any one of the transmission power, reception sensitivity, transmission communication rate, and transmission spacing may be used.

All or a portion of the above-described embodiments can be described as shown in the following notes but are not limited to the following supplementary notes.

[Supplementary Note 1]

In a communication system including predetermined vehicle-mounted devices respectively mounted in a plurality of vehicles and a vehicle-mounted device performing communication by means of radio signals with the predetermined vehicle-mounted devices, each of the predetermined vehicle-mounted devices transmits to the vehicle-mounted device a value of, among parameters that relate to communication of the predetermined vehicle-mounted devices, a predetermined parameter for which the degree of contribution to congestion increases with increase in the predetermined parameter; and the vehicle-mounted device includes: a radio unit detecting radio signals to measure congestion level; a processor receiving, from the respective predetermined vehicle-mounted devices, the values of the predetermined parameter of the predetermined vehicle-mounted devices; and a controller decreasing, when the congestion level measured by the radio unit exceeds a predetermined threshold value, the value of predetermined parameter of its own device when the value of the predetermined parameter of its own device is greater than the average of the values of the predetermined parameter received by the processor.

[Supplementary Note 2]

A congestion control method of a communication system including predetermined vehicle-mounted devices respectively mounted in a plurality of vehicles and a vehicle-mounted device performing communication by means of radio signals with the predetermined vehicle-mounted devices, the method includes steps of:

each of the predetermined vehicle-mounted devices transmitting to the vehicle-mounted device a value of, among parameters that relate to communication of the predetermined vehicle-mounted devices, a predetermined parameter for which the degree of contribution to congestion increases with increase in the predetermined parameter; the vehicle-mounted device detecting radio signals to measure congestion level; the vehicle-mounted device receiving from each of the predetermined vehicle-mounted devices the value of the predetermined parameter of the predetermined vehicle-mounted device; and when the congestion level measured exceeds a predetermined threshold value, decreasing the value of the predetermined parameter of its own device when the value of the predetermined parameter of its own device is greater than the average of the values of the predetermined parameter that are received.

The configuration shown in the figures in the above-described exemplary embodiment is only an example, and the present invention is not limited to this configuration.

This application is based on and claims the benefits of priority from Japanese Patent Application No. 2010-215333, filed on Sep. 27, 2010, all of the disclosures of which are incorporated herein by reference.

EXPLANATION OF REFERENCE SIGNS 100 communication system
300 vehicle-mounted device
310 radio unit
311 antenna
312 switch
313 radio receiver
314 radio transmitter
320 processor
321 reception processing unit
322 application unit
323 transmission processing unit
330 controller

CITATION LIST

Patent Literature

Patent Literature 1: WO2008/099716.

What is claimed is:

1. A vehicle-mounted device that performs communication by radio signals with predetermined vehicle-mounted devices respectively mounted in a plurality of vehicles, comprising:
   a radio unit detecting said radio signals to measure congestion level;
   a processor receiving, from each of said predetermined vehicle-mounted devices, a value of, among parameters relating to communication of the predetermined vehicle-mounted devices, a predetermined parameter for which degree of contribution to congestion increases with increase in the value of the predetermined parameter; and
   a controller decreasing, when the congestion level measured by said radio unit exceeds a predetermined threshold value, the value of said predetermined parameter of its own device when the value of said predetermined parameter of its own device is greater than an average of values of the predetermined parameter that are received by said processor,
   wherein:
   said processor further receives from each of said predetermined vehicle-mounted devices congestion levels measured by the predetermined vehicle-mounted devices; and
   said controller, when said processor receives the value of said predetermined parameter and said congestion levels, judges whether either of the congestion level measured by said radio unit or an average of the congestion levels received by said processor exceeds said predetermined threshold value, and when either of the congestion level measured or the average exceeds said predetermined threshold value, decreases the value of said predetermined parameter of its own device when said value of the predetermined parameter of its own device is greater than the average of the values of the predetermined parameter that are received by said processor.

2. The vehicle-mounted device as set forth in claim 1, wherein said controller, when said value of said predetermined parameter of its own device is greater than said average, decreases said value of the predetermined parameter of its own device to a value less than said average.

3. The vehicle-mounted device as set forth in claim 2, wherein said controller, after decreasing said value of the predetermined parameter of its own device, increases said value of the predetermined parameter of its own device when neither the congestion level measured by said radio unit nor the average of the congestion levels received by said processor exceeds a specific threshold value that is lower than said predetermined threshold value.

4. The vehicle-mounted device as set forth in claim 1, wherein said controller, after decreasing said value of the predetermined parameter of its own device, increases said value of the predetermined parameter of its own device when neither the congestion level measured by said radio unit nor the average of the congestion levels received by said processor exceeds a specific threshold value that is lower than said predetermined threshold value.

* * * * *